United States Patent
Um

(10) Patent No.: US 7,280,532 B2
(45) Date of Patent: Oct. 9, 2007

(54) CALL SET-UP METHOD USING SIP-T OVERLAP SIGNALING

(75) Inventor: Tae-Hwan Um, Seoul (KR)

(73) Assignee: LG Electronics Inc., Seoul (KR)

( * ) Notice: Subject to any disclaimer, the term of this patent is extended or adjusted under 35 U.S.C. 154(b) by 1100 days.

(21) Appl. No.: 10/187,626

(22) Filed: Jul. 3, 2002

(65) Prior Publication Data

US 2003/0007483 A1 Jan. 9, 2003

(30) Foreign Application Priority Data

Jul. 4, 2001 (KR) .............................. 2001-39768

(51) Int. Cl.
*H04L 12/66* (2006.01)
(52) U.S. Cl. ................. 370/352; 370/395.2; 370/524
(58) Field of Classification Search ................ 370/352, 370/395.1, 395.2, 522, 524
See application file for complete search history.

(56) References Cited

U.S. PATENT DOCUMENTS

| | | | | |
|---|---|---|---|---|
| 5,881,145 A * | 3/1999 | Giuhat et al. | .......... | 379/221.13 |
| 5,987,112 A * | 11/1999 | Chakravarti et al. | ... | 379/209.01 |
| 6,252,952 B1 * | 6/2001 | Kung et al. | .............. | 379/114.1 |
| 6,480,597 B1 * | 11/2002 | Kult et al. | ................... | 379/242 |
| 6,636,596 B1 * | 10/2003 | Gallant et al. | ......... | 379/220.01 |
| 6,765,903 B1 * | 7/2004 | Allen et al. | .................. | 370/356 |
| 6,765,912 B1 * | 7/2004 | Vuong | ..................... | 370/395.2 |
| 6,876,646 B1 * | 4/2005 | Dore et al. | ................. | 370/352 |

OTHER PUBLICATIONS

Gonzalo Camarillo et al.; IETF Draft ISUP to SIP Mapping; Aug. 2001 pp. 1-9.

* cited by examiner

*Primary Examiner*—Chau Nguyen
*Assistant Examiner*—Hicham B Foud
(74) *Attorney, Agent, or Firm*—Ked & Associates, LLP

(57) ABSTRACT

In a call set-up method using SIP-T overlap signaling, rather than waiting for receiving every digit of a called number dialed by a caller, when digits capable of a number translation are received, a bearer channel connection is immediately performed so that a delay in transmission of a ring back tone can be prevented. In addition, in case of using a user data protocol (UDP) within an Internet protocol network in order to connect an originating PSTN and a terminating PSTN, INVITE messages are transmitted with some time difference, which makes it difficult for the terminating PSTN to know the transmission order of destination digits. In transmitting the messages using the UDP protocol, SIP "To" header lengths of the INVITE messages are compared in order to recognize a transmission order of the dialed digits. Therefore, more effective sequence delivery can be provided.

30 Claims, 4 Drawing Sheets

CALL SET-UP METHOD USING SIP-T OVERLAP SIGNALING

BACKGROUND OF THE INVENTION

1. Field of the Invention

The present invention relates to information communications systems, and more particularly to a system and method for transmitting calls between networks which adhere to different communications protocols.

2. Background of the Related Art

A gateway serves as an interface between networks which use different protocols such as a public switched telephone network (PSTN), an Internet protocol (IP) network, or an integrated services digital network (ISDN). One type of protocol known as a session initiation protocol-telephone (SIP-T) protocol uses a session initiation protocol (SIP) to interface between a PSTN and an IP network. In one common application, the SIP-T is used as a protocol between media gateway controllers (MGC) when an ISDN user part (ISUP) message of the PSTN is transmitted to an asynchronous transfer mode (ATM)-based IP network.

FIG. 1 shows an open network structure for providing a voice-based ATM service. As shown, when a call set-up request is received from an originating PSTN network 10a, an origination MGC 30a transmits an SIP message to a terminating MGC 30b using the SIP-T protocol to request a call set-up from a terminating PSTN network 10b. The originating and terminating MGCs 30a and 30b control connection and release of an ATM bearer channel (64 Kbps) between the originating and terminating media gateways (MG) 40a and 40b.

FIG. 2 shows a structure of the originating and terminating MGCs 30a and 30b. Each of these MGCs includes an ISUP block 31, a number translation (NTR) block 32, an SIP-T block 33, and a MEGACO block 34. The ISUP block 31 transmits and receives an ISUP message (IAM) required for a call set-up to and from the PSTN network (10a or 10b) through the SG 20a or 20b, and transmits a called party number contained in the corresponding ISUP message to the NTR block 32 to request a number translation. In addition, if a request for an additional digit required for the number translation is received from the NTR block 32, the ISUP block 31 collects the additional digit from the PSTN network (10a or 10b) and sends the number translation to the NTR block 32.

The NTR block 32 performs a number translation on the called party number according to the number translation request from the ISUP block 31 and provides an IP address of the terminating MGC 30b as a number translation result.

The SIP-T block 33 performs a Transmission Control Protocol (TCP)/User Data Protocol (UDP) connection to the terminating MGC 30b using the IP address of the terminating MGC 30b, which is obtained according to the number translation performed by the NTR block, and then performs connection and release functions for the bearer channel between the originating and terminating MGs 40a and 40b through the MEGACO block 34.

The MEGACO block 34 serves an interface between the SIP-T block 33 and the MG 40a or 40b. In performing this function, the MEGACO block transmits a command for controlling the connection and release of the ATM bearer channel to the MG, receives a response signal from the MG, and then provides the response signal to the SIP-T block 33.

FIG. 3 shows steps included in a call set-up process according to a related art which uses SIP-T overlap signaling in a voice-based open network. In this figure, the suffix 'a' is attached to reference numerals of the call originating side and the suffix 'b' is attached to reference numerals of the call terminating side. According to this process, when a caller connected to the PSTN network 10a dials a called party number (e.g., 450-7348), a switching system (not shown) of the PSTN network 10a inserts information into an ISUP message which includes an initial address message (IAM) and subsequent address messages (SAMs). The IAM message includes digits ('450') of the dialed number and the SAMs messages respectively include digit pairs ('73') and ('48') of the dialed number. These messages are then transmitted through the SG 20a to the originating MGC 30a.

The ISUP block 31a of the originating MGC transmits the called digits ('450') contained in the IAM to the NTR block 32a, and transmits the number translation result provided from the NTR block 32a (i.e., an IP address of the terminating MGC 30B) together with the IAM to the SIP-T block 33a.

The SIP-T block 33a is connected to the terminating MGC 30b via the TCP/UDP protocol using the IP address of the terminating MGC 30b, configures a new IAM ('4507348') by combining the IAM ('450') and the SAMs ('73' and '48'), and generates an SIP message (i.e., an INVITE message) containing the new IAM and transmits it to the terminating MGC 30b. In this respect, the SIP message includes the INVITE message and various status messages.

FIG. 4 shows a transfer structure of the INVITE message, which is one example of the SIP message. The INVITE message includes: a header containing a transmission medium request (TMR) for requesting a request line, a calling party number, a called party number, and a voice band width; a session description protocol (SCP) defining an attribute of the bearer channel; and the IAM.

After the SIP-T block 33a generates the INVITE message, it waits for receiving every digit before transmitting the INVITE message to the terminating MGC 30b. More specifically, the SIP-T block 33a collects the digits of the called party number until an inter-digit timer is terminated, and then includes the collected digits into the IAM and transmits the IAM containing the destination digits to the terminating MGC 30b.

Returning to FIG. 3, when transmitting the INVITE message, in order to manage information on a call leg (Cleg), the SIP-T block 33a assigns a call leg number which is available for use (e.g., '1'), to the INVITE message.

Upon receiving the INVITE message, the SIP-T block 33b of the terminating MGC 30b transmits the called party number ('4507348') contained in the INVITE message to the NTR block 32b to request a number translation, so that the originating and terminating PSTN networks 10a and 10b can establish an ATM bearer channel through the MGs 40a and 40b. In addition, in order to prevent re-transmission of the INVITE message managed with the call leg (CLeg) '1', the SIP-T block 33b transmits a status message ('100') indicating that the call is currently attempting a call setup to the SIP-T block 33a.

After the NTR block 32b successfully performs the number translation, the SIP-T block 33b controls the terminating MG 40b through the MEGACO 34b with reference to the bearer attribute based on the SDP information of the INVITE message, so as to establish the ATM bearer channel between the originating and terminating MGs 40a and 40b. At the same time, SIP-T block 33b transmits the IAM message containing the called party number ('4507348') through the ISUP block 31b to the terminating PSTN network.

At this time, the switching system (not shown) of the terminating PSTN network performs a number translation on the received IAM message and transmits a call signal to a callee of the corresponding call. At the same time, the switching system transmits an address complete message (ACM), indicating that the called party number has been completely received and the call signal has been transmitted, through the ISUP block 31b to the SIP-T block 33b.

Upon receiving the ACM, the SIP-T block 31b transmits a status message ('180') indicating that the call signal (Ring) is being transmitted for the CLeg '1', to the SIP-T block 33a of the originating MGC 30a. And then, the SIP-T block 33a transmits the ACM message through the ISUP block 31a to the PSTN network 10a, so that the ring back tone is transmitted to the call sender by the PSTN network 10a.

Thereafter, when the callee answers the call request, the terminating PSTN network 10b transmits an answer message (ANM) indicating that the call receiver has answered, through the ISUP block 31b to the SIP-T block 33b. The SIP-T block 31b then transmits a status message ('200') indicating that the callee has answered to the SIP-T block 33a of the MGC 30a.

In response, the SIP-T block 33a transmits an acknowledgment ACK message to the SIP-T block 33b. At the same time, an ANM message is transmitted through the ISUP block 31a to the PSTN network 10a, so that a speech path is connected between the PSTN networks 10a and 10b through the ATM network 50. The caller and callee can then make a phone call.

In the call set-up method of the related art previously described, the originating MGC waits for receiving every digit before transmitting the INVITE message to the terminating PSTN network. That is, the originating MGC collects the digits of the called party number the caller has dialed until the inter-digit timer has expired and only then transmits the ISUP IAM message to the terminating PSTN network. This approach when applied using the SIP-T protocol has the following problem. Because the digits are not transmitted until after the inter-digit timer has expired are transmitted, and because the procedure for establishing the bearer channel therefore does not start until the inter-digit timer has expired, there is a disadvantage for the caller who can only hear a ring back tone after a delay caused by the time required for the inter-digit timer set-up process. A need therefore exists for an improved system and method for establishing a call, and more specifically one which does not introduce the delays contained in the related art.

SUMMARY OF THE INVENTION

An object of the present invention is to provide a call set-up method using SIP-T overlap signaling which prevents a delay of a ring back tone transmission from occurring by initiating the establishment of a bearer channel at a point in time when digits capable of number translation are received.

Another object of the present invention is to provide a call set-up method using an SIP-T overlap signaling that is capable of effectively supporting overlap signaling by compulsorily terminating a previously managed call leg whenever a subsequent address message (SAM) containing a subsequent digit is received.

Still another object of the present invention is to provide a call set-up method using SIP-T overlap signaling that is capable of providing an effective sequence delivery by determining a transmission order of messages based on a SIP "To"-header length of SIP messages in transmitting the SIP messages by using a user data protocol (UDP) protocol.

To achieve at least the above objects in whole or in part, a first embodiment of a call set-up method using an SIP-T overlap signaling includes the steps of: receiving at least one INVITE message managed with a predetermined call leg from an originating MGC, so as to receive digits capable of number translation; connecting an ATM bearer channel, and transmitting the received called party number to a terminating PSTN network at the time point when the called party number so many as to allow the number translation are received.

A second embodiment of the call set-up method using an SIP-T overlap signaling includes the steps of: receiving at least one INVITE message managed with a predetermined call leg from an originating MGC, so as to receive digits capable of number translation; connecting an ATM bearer channel and transmitting the received digits to a PSTN network, when a number of digits are received that will allow number translation to be performed; compulsorily terminating a previous call leg managed by the originating MGC, when INVITE message which includes a subsequent digits and is managed with a different call leg is received from the originating MGC; and transmitting the receiving subsequent digits to a terminating PSTN network and transmitting a ring back tone to a caller of an originating PSTN network through the origination MGC.

Additional advantages, objects, and features of the invention will be set forth in part in the description which follows and in part will become apparent to those having ordinary skill in the art upon examination of the following or may be learned from practice of the invention. The objects and advantages of the invention may be realized and attained as particularly pointed out in the appended claims.

BRIEF DESCRIPTION OF THE DRAWINGS

The invention will be described in detail with reference to the following drawings in which like reference numerals refer to like elements wherein.

DETAILED DESCRIPTION OF PREFERRED EMBODIMENTS

Figure 1:
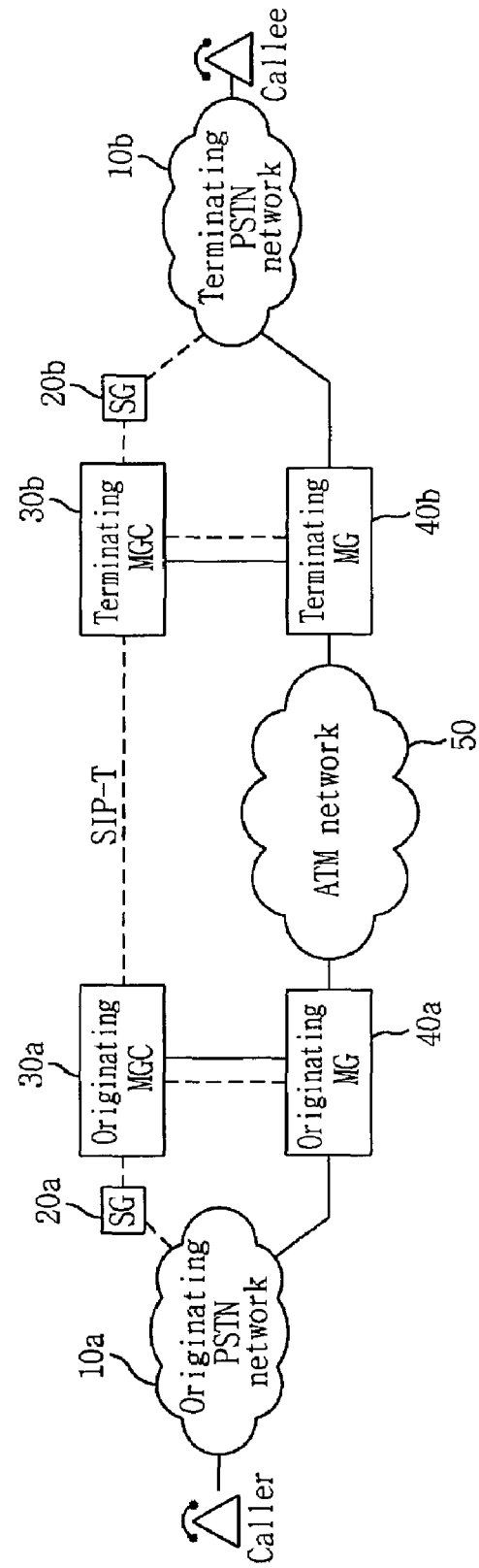
FIG. 1 is a diagram showing an open-network structure which provides a voice-based ATM service in accordance with a related art.
Figure 2:
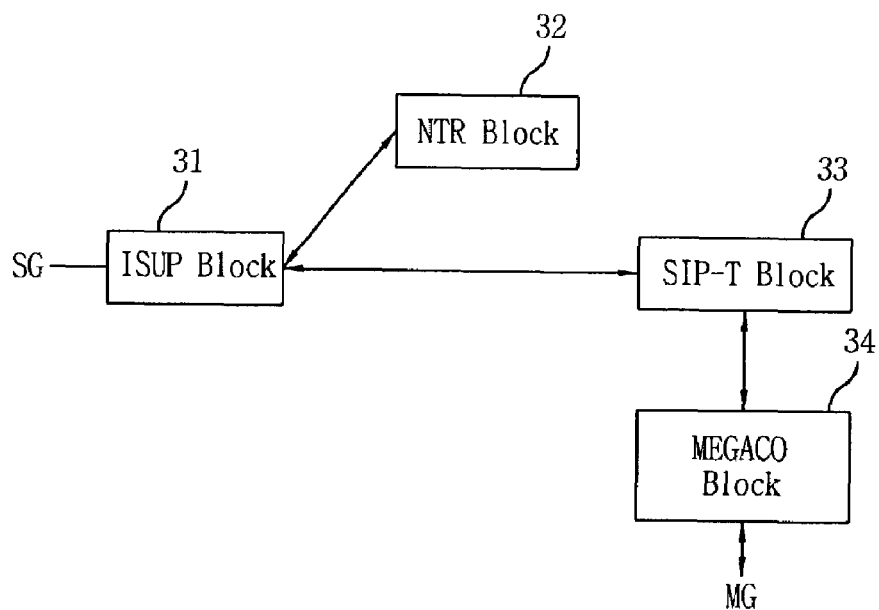
FIG. 2 is a diagram illustrating a detailed construction of an originating media gateway controller and a terminating media gateway controller of FIG. 1 in accordance with the related art.
Figure 4:
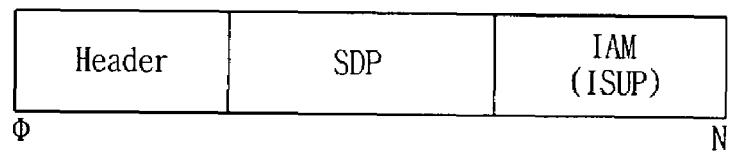
FIG. 4 is a flow diagram illustrating call processing of a call set-up method using an SIP-T overlap signaling performed in accordance with the related art shown in FIG. 1.
Figure 3:
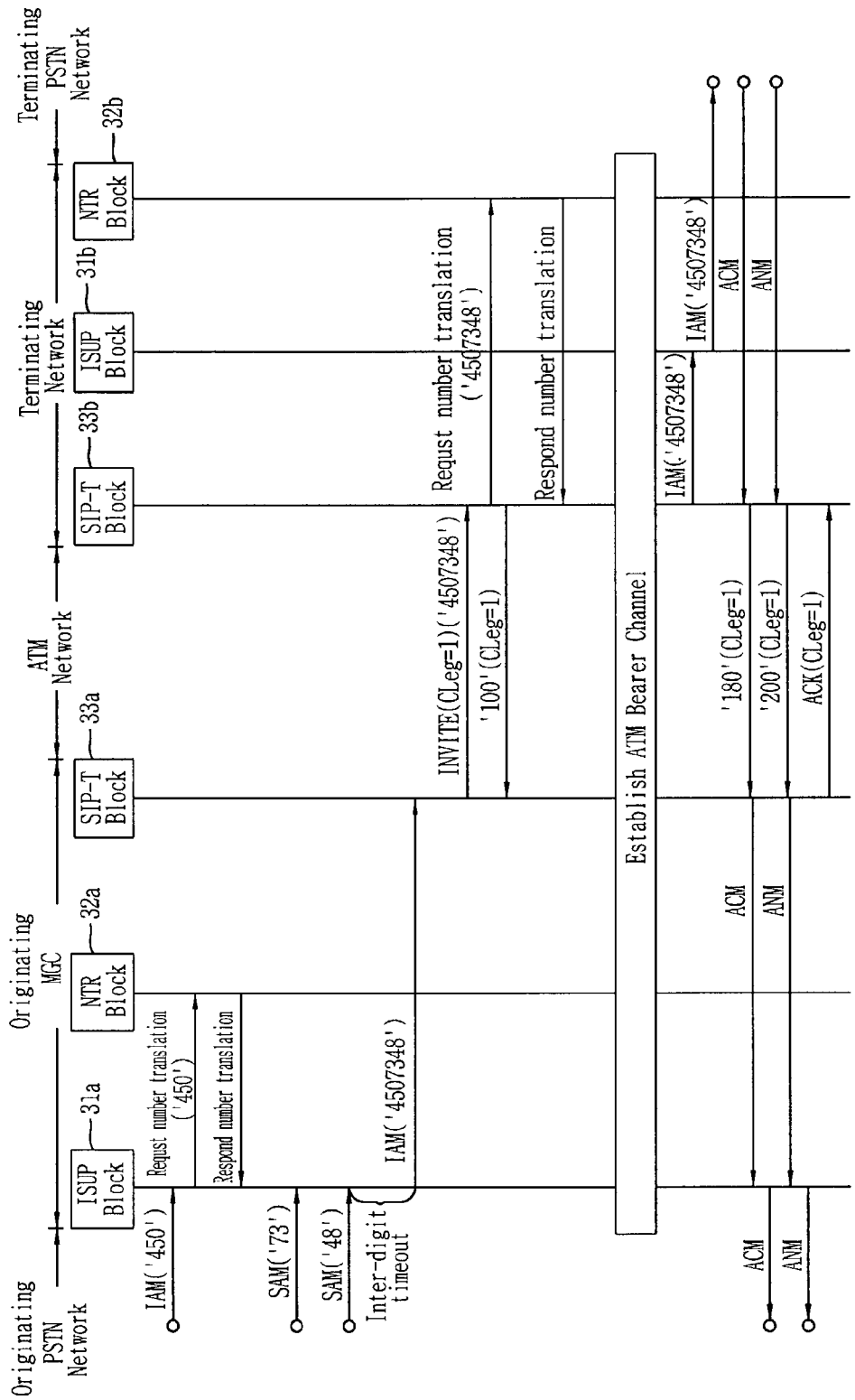
FIG. 3 is a diagram showing a structure of an SIP message (INVITE message) transmitted and received between the originating media gateway controller and the terminating media gateway controller of FIG. 1 in accordance with the related art.

A call set-up method according to at least one embodiment of the present invention may be used within an open-network structure for providing a voice-based ATM service, as illustrated in FIG. 1. Unlike the related art, rather than waiting for receiving every digit of a called party number dialed by a caller to establish a bearer channel, the call set-up method of the present invention establishes a bearer channel as soon as digits capable of a number translation are received. This produces the beneficial result of preventing a transmission delay of a ring back tone from occurring.

Figure 5:
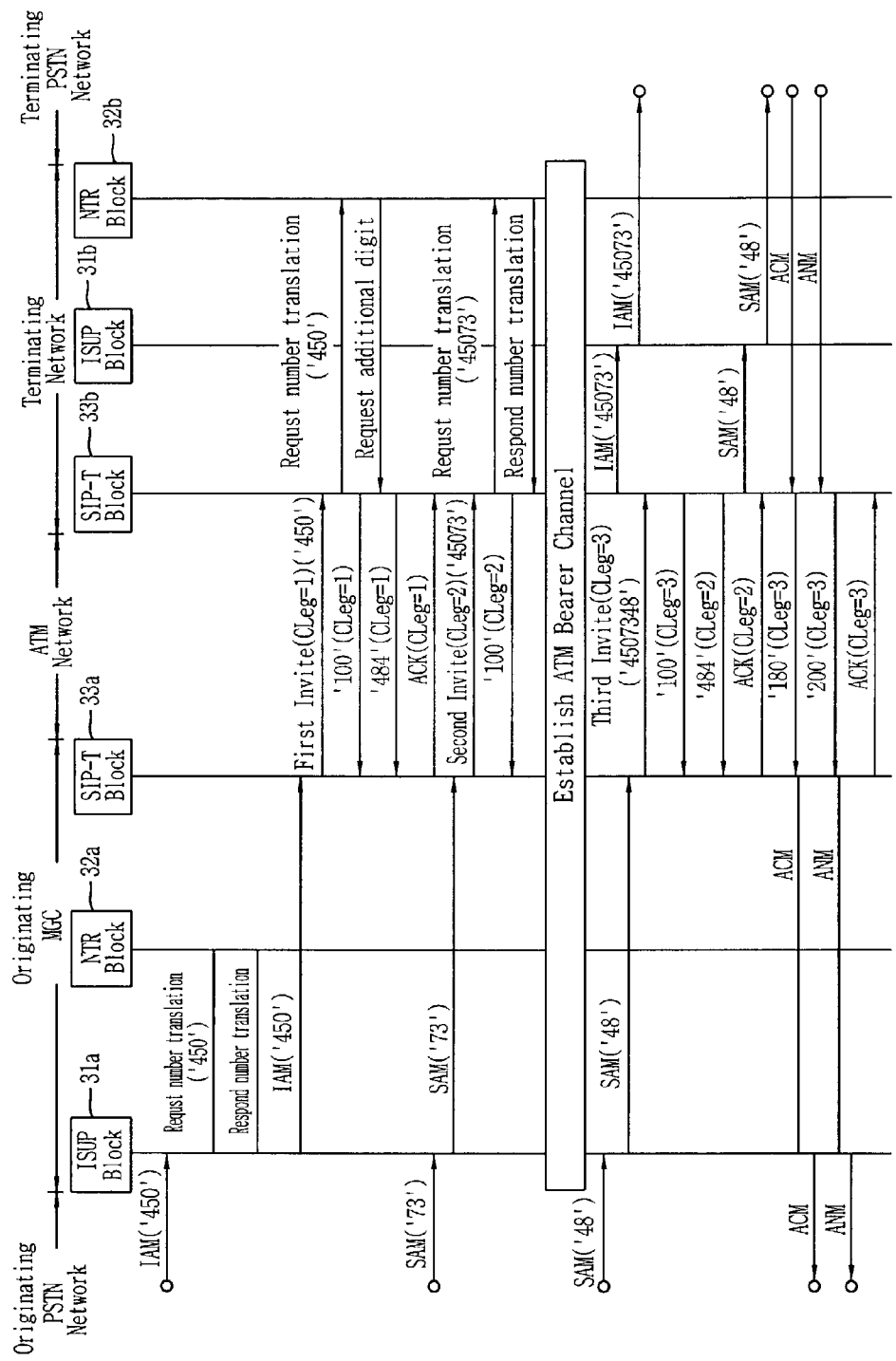
FIG. 5 is a flow diagram showing steps included in a call-set method using SIP-T overlap signaling in an open-network structure for providing a voice-based ATM service in accordance with one embodiment of the present invention.

FIG. 5 is a flow diagram showing steps included in a call-set method, using an SIP-T overlap signaling, in accordance with one embodiment of the present invention. In an initial step, when a caller dials a called party number (e.g., 450-7348), an IAM message transmitted from a PSTN 10a to an originating MGC 30a contains a minimum number of terminating digits '450' which is available for a path set-up to the terminating PSTN 10b among the dialed digits ('4507348') and information required for call set-up.

Upon receiving the IAM message, an ISUP block 31a of the originating MGC 30a transmits the digits ('450') contained in the IAM message to an NTR block 32a to request a number translation. The ISUP block then transmits a number translation result from the NTR block (e.g., an IP address of the destination MGC 30b) with the IAM message to an SIP-T block 33a.

The SIP-T block 33a generates a first INVITE message containing the IAM message using the IP address of the terminating MGC 30b, and then transmits the first INVITE message to the MGC 30b. In performing this step, the SIP-T block 33a assigns a call leg number '1' to the first INVITE message in order to manage the information on the call leg (CLeg). If desired, the transfer structure of the INVITE message may be the same as that of the related art.

Once the SIP-T block 33a receives enough of the destination digits to perform the number translation, which in accordance with this embodiment may be three, the SIP-T block 33a immediately generates the INVITE message and transmits it to SIP-T block 33b, rather than waiting for receiving every digit of the called number before transmitting the INVITE message to the terminating MGC 30B.

The SIP-T block 33b of the MGC 30b extracts the digits ('450') from the first INVITE message transmitted from the originating MGC 30a and requests a number translation from the NTR block 32b. In order to prevent re-transmission of the first INVITE message, the SIP-T block 33b may transmit a status message ('100') to the SIP-T block 33a indicating that a call setup request is currently being attempted.

Meanwhile, if the number translation is not successfully performed and one or more additional digits (e.g., 2 digits) are requested by the NTR block 32b, (that is, in case that an ATM bearer channel fails to be set with the digits ('450') according to the number translation result) the SIP-T block 33b transmits a status message ('484') to the SIP-T block 33a indicating an address incomplete as a response signal of the first INVITE message managed as CLeg '1'. Then, the SIP-T block 33a transmits a response message (ACK) to the status message ('484'), terminates the CLeg '1' which itself has managed for a call set-up, and manages the digits ('450') stored for the CLeg '1' as is without deletion.

While the SIP-T block 33a is processing the INVITE message with the terminating MGC 31b, the ISUP block 31a of the originating MGC 31a receives one or more subsequent address messages (SAMs) containing destination digits from the originating PSTN 10a. The ISUP block then transmits the SAM messages to the SIP-T BLOCK 33a. Since the originating PSTN 10a first transmit digits '73' first collected among the digits ('7348') and then transmits the remaining digits '48', the SIP-T block 33a first receives the SAM message containing the digits ('73').

Upon receiving the first SAM message containing the digits ('73'), the SIP-T block 33a generates a second INVITE message containing the digits ('45073') which has been received and managed as CLeg '2', and transmits the second INVITE message to the SIP-T block 33b of the terminating MGC 31b.

As stated above, the SIP-T block 33b of the terminating MGC 30b transmits the digits ('45073') contained in the second INVITE message to the NTR block 32b to request a number translation, and transmits a status message ('100') indicating the status of 'trying', to the SIP-T block 33a so as to prevent re-transmission of the second INVITE message.

When the number translation is successfully performed in the NTR block 32b, the SIP-T block 33b searches a bearer attribute from the SDP information of the second INVITE message and controls a terminating MG 40b through an MEGACO 34b, so as to perform an ATM bearer connection between the originating MG 40a and the terminating MG 40b. At the same time, the IAM message containing the digits ('45073') is transmitted through the ISUP block 31b to the terminating PSTN 10b.

As the ATM bearer channel is connected between the originating MG 40a and the terminating MG 40b, the ISUP 31a of the originating MGC 30a receives a second SAM message containing the digits ('48') from the originating PSTN 10a, and transmits the second SAM message to the SIP-T block 33a. Then, the SIP-T block 33a generates a third INVITE message containing the digits ('4507348') which has been received and managed as a CLeg '3' and transmits the third INVITE message to the SIP-T block 33b of the terminating MGC 31b.

The SIP-T block 33b of the terminating MGC 30b transmits a status message ('100') indicating that a call setup request is being attempted in order to prevent re-transmission of the third INVITE message, and a status message ('484') indicating an address incomplete as a final response signal to the second INVITE message managed as CLeg '2', to the SIP-T block 33a. In addition, the SIP-T block 33b transmits the second SAM message through the ISUP block 31b to the terminating PSTN 10b.

After the SIP-T block 33a transmits a response message (ACK) to the status message ('484') and terminates the CLeg '2' which itself has managed for a call set-up. The terminating PSTN 10b performs a number translation on the received IAM ('45073') and the second SAM message ('48') so as to transmit a call signal to a callee and also transmits an address complete message (ACM) to the SIP-T block 33b indicating that every digit has been completely received and the call signal has been transmitted.

Upon receiving the ACM, the SIP-T block 31b transmits a status message ('180') to the SIP-T block 33a of the originating MGC 30a indicating that a call signal is currently being transmitted for the CLeg '3'. The SIP-T block 33a transmits the ACM message through the ISUP block 31a to the PSTN 10a, so that the ring back tone is transmitted to the caller by the PSTN 10a.

Thereafter, when the callee answers to the call request, the originating PSNT 10b transmits an answer message (ANM) indicating that the callee has answered to the SIP-T block 33b, and the SIP-T block 31b transmits a status message ('200') indicating that the callee has answered to the SIP-T block 33a of the MGC 30a.

Accordingly, the SIP-T block 33a transmits a response message (ACK) to the SIP-T block 33b and also transmits the received ANM through the ISUP block 31a to the PSTN 10a, so that a speech path is connected between the PSTN 10a and the PSTN 10b through the ATM network 50 and a voice communication can be made between the caller and the callee.

The call set-up method of the present invention, which uses SIP-T overlap signaling has many advantages. For example, rather than waiting for receiving every digit of a called party number dialed by a caller, when digits capable of number translation are received, a bearer channel connection is immediately performed, so that a delay in transmission of a ring back tone, as occurring in the related art, can be prevented.

Also, in case of using a user data protocol (UDP) within an Internet protocol network in order to connect an originating PSTN and a terminating PSTN, the transmitted SIP messages (i.e., the INVITE messages) are transmitted with some time difference, which makes it difficult for the terminating PSTN to know the transmission order of destination digits. Thus, in the present invention, in transmitting the SIP messages using the UDP protocol, SIP "To" header lengths of the SIP messages (INVITE) are compared to recognize the transmission order of the destination digits. Therefore, more effective sequence delivery can be provided.

Still further, since every time the SAM message containing the subsequent digits is received, the previous call leg is terminated, so that an overlap signaling can be more effectively supported.

The foregoing embodiments and advantages are merely exemplary and are not to be construed as limiting the present invention. The present teaching can be readily applied to other types of apparatuses. The description of the present invention is intended to be illustrative, and not to limit the scope of the claims. Many alternatives, modifications, and variations will be apparent to those skilled in the art. In the claims, means-plus-function clauses are intended to cover the structure described herein as performing the recited function and not only structural equivalents but also equivalent structures.

What is claimed is:

1. A call set-up method using SIP-T overlap signaling, comprising:
   receiving information from an originating network, said information including a predetermined number of digits of a called telephone number within at least one INVITE message containing a bearer attribute, all the digits of the telephone number being allocated among an initial address message (IAM) and one or more subsequent address messages (SAMs), said predetermined number of digits being less than all digits of the called telephone number; and
   establishing an ATM bearer channel between the originating network and a terminating network based on the at least one INVITE message.

2. The method of claim 1, wherein the portion of said predetermined number of digits in the IAM corresponds to a minimum number of digits required to establish a path set-up between the originating network and the terminating network.

3. The method of claim 1, wherein said at least one INVITE message includes:
   a first INVITE message which includes the initial address message (IAM) containing a first portion of said predetermined number of digits of the called telephone number; and
   a second INVITE message which includes at least a first subsequent address message (SAM) containing a second portion of said predetermined number of digits of the called telephone number, wherein said first INVITE message and said second INVITE message are received by the terminating network in different call legs.

4. The method of claim 3, wherein the first INVITE message includes:
   a header containing a caller number and the called number; and
   session description protocol (SDP) information which includes the bearer attribute of the ATM bearer channel, wherein the first portion of said predetermined number of digits of the called number contained in the initial address message (IAM) of the first INVITE message corresponds to a minimum number of digits required to establish a path set-up between the originating network and the terminating network.

5. The method of claim 4, wherein the second INVITE message includes:
   a header containing a caller number and the called number; and
   session description protocol (SDP) information defining a bearer attribute of the ATM bearer channel, wherein the second INVITE message is received by the terminating network after the first INVITE message is transmitted to the terminating network.

6. The method of claim 3, further comprising:
   translating digits of the called number contained in the IAM;
   transmitting the first INVITE message to the terminating network along a first call leg;
   translating the digits of the called number contained in the IAM of the first INVITE message, and
   receiving the second INVITE message which contains at least the first SAM managed along a second call leg, after a status message for terminating the first call leg is transmitted to the originating network, if the number translation failed.

7. A call-set up method using SIP-T overlap signaling, comprising:
   receiving information from an originating network, said information including a predetermined number of digits of a called number within a first INVITE message containing a bearer attribute, said predetermined number of digits being less than all digits of the called number;
   receiving a second INVITE message from the originating network, said second INVITE message including additional digits of the called number;
   establishing an ATM bearer channel between the originating network and a terminating network based the first and second INVITE messages, said method further comprising terminating a call leg during which said first INVITE message was transmitted when said second INVITE message is received.

8. The method of claim 7, further comprising:
   transmitting a ring back tone to the originating network after the ATM bearer channel is established.

9. The method of claim 1, wherein the originating network and terminating network are both public switched telephone networks, and wherein the originating network is connected to the terminating network through an internet protocol network.

10. The method of claim 1, further comprising:
    performing a number translation of said predetermined number of digits received in said at least one INVITE message;
    determining whether said number translation is successful; and performing said establishing step if said number translation is successful.

11. The method of claim 10, wherein if said number translation is unsuccessful, said method further includes: transmitting a request for additional digits of the called number to the originating network.

12. The method of claim 11, further comprising:
receiving a second INVITE message containing a bearer attribute and said additional digits of the called number; and
establishing an ATM bearer channel between the originating network and a terminating network based on the bearer attribute in said second INVITE message.

13. A call set-up method using an SIP-T overlap signaling, comprising:
receiving information from an originating network, said information including a first INVITE message having a predetermined number of digits of a called number; said predetermined number of digits being less than all digits of the called number; and
terminating a call leg used to manage transmission of the first INVITE message, said terminating step being performed when a second INVITE message is received containing additional digits of the called number and a bearer attribute; and
connecting an ATM bearer channel between the originating network and a terminating network based on the bearer attribute in the second INVITE message;
transmitting remaining digits of the called number to the terminating network; and
transmitting a ring back tone to a caller of the originating network.

14. The method of claim 13, wherein the first INVITE message contains an initial address message (IAM) transmitted from the originating network along a first call leg.

15. The method of claim 13, wherein:
the first INVITE message contains an initial address message (IAM) transmitted from the originating network and managed along a first call leg; and
the second INVITE message contains a subsequent address message (SAM) transmitted from the originating network and managed along a second call leg.

16. The method of claim 15, wherein the first INVITE message comprises:
a header containing a caller number and said predetermined number of digits of the called number; and
session description protocol (SDP) information which includes a bearer attribute of the ATM bearer channel, wherein the IAM includes said predetermined number of digits of the called number which corresponds to a minimum number of digits required to establish a path set-up from the originating network to the terminating network.

17. The method of claim 15, wherein the second INVITE message comprises:
a header containing a caller number and said additional digits of the called number; and
session description protocol (SDP) information which includes a bearer attribute of the ATM bearer channel, wherein the SAM includes the additional digits of the called number and wherein the second INVITE message is transmitted after the IAM is received from the originating network in the first INVITE message.

18. The method of claim 13, wherein the receiving step includes:
translating said predetermined number of digits in the called number;

receiving the first INVITE message withing a first call leg from the terminating network;
performing a number translation of the predetermined number of digits in the called number when the first INVITE message is received; and
receiving the second INVITE message from the originating network within a second call leg, after a status message for terminating the first call leg is transmitted to the originating network and if the number translation failed.

19. A call set-up method using SIP-T overlap signaling, comprising:
transmitting information from an originating network to a terminating network within a first call leg, said information including a first INVITE message containing a predetermined number of digits of a called party number, said predetermined number of digits being less than all digits of the called party number;
checking whether the predetermined number of digits in the first INVITE message can be translated by a gateway controller of a terminating network;
transmitting a status message for terminating the first call leg to the originating network if at least one additional digit is required;
transmitting a second INVITE message to the originating network, said second INVITE message including a bearer attribute, said predetermined number of digits, and at least one additional digit of the called party number during a second call leg;
determining whether said predetermined number of digits and said at least one additional digit can be translated; and
establishing an ATM bearer channel based on the bearer attribute in the second INVITE message if the said predetermined number of digits and said at least one additional digital can be translated.

20. The method of claim 19, further comprising:
terminating the second call leg when a third INVITE message containing remaining digits of the called number is received from the originating network within a third call leg; and
transmitting a ring back tone to the originating network.

21. The method of claim 19, wherein the first INVITE message comprises:
a header which includes a caller number and said predetermined number of digits of the called party number; and
session description protocol (SDP) information defining a bearer attribute of the ATM bearer channel; wherein the predetermined number of digits in the header corresponds to a minimum number of digits which are available for establishing a path set-up between the originating network and the terminating network.

22. The method of claim 19, wherein the second INVITE message comprises:
a header which includes a caller number, said predetermined number of digits, and said at least one additional digit of the called party number; and
session description protocol (SDP) information which includes the bearer attribute of the ATM bearer channel.

23. A call set-up method, comprising:
receiving information from an originating network, said information including a predetermined number of digits of a called telephone number within at least one INVITE message containing a bearer attribute, all the digits of the telephone number allocated among an initial address message (IAM) and one or more subsequent address messages (SAMs), said predetermined number of digits equal to a minimum number of digits required to perform a number translation that determines an address of a gateway controller within an intermediate network located between the originating network and a terminating network; and establishing an ATM bearer channel between the originating network and a terminating network based on the at least one INVITE message.

24. The method of claim 23, wherein the originating network and terminating network are both public switched telephone networks, and the intermediate network is an internet protocol network.

25. A call set-up method, comprising:

transmitting information from an originating network, said information including a predetermined number of digits of a called telephone number, all the digits of the telephone number being allocated among an initial address message (IAM) and one or more subsequent address messages (SAMs), said predetermined number of digits equal to a minimum number of digits required to perform a number translation that determines an address of a gateway controller within an intermediate network located between the originating network and a terminating network; and establishing an ATM bearer channel between the originating network and a terminating network based on information received from the terminating network.

26. The method of claim 25, wherein the originating network and terminating network are both public switched telephone networks, and the intermediate network is an internet protocol network.

27. A system for setting up a call between an originating network and a terminating network, comprising:

a first SIP-T unit which transmits information to the originating network, said information including an INVITE message containing a bearer attribute and a predetermined number of digits of a called number, all the digits of the telephone number allocated among an initial address message (IAM) and one or more subsequent address messages (SAMs), said predetermined number of digits, said predetermined number of digits being less than all digits of the called number; and a second SIP-T unit which establishes an ATM bearer channel between the originating network and a terminating network based on the bearer attribute in said at least one INVITE message.

28. The system of claim 27, wherein the originating network and terminating network are both public switched telephone networks, and wherein the originating and terminating networks are connected to one another through an internet protocol network.

29. The system of claim 27, further comprising:

a number translator which translates said predetermined number of digits of the called number into an address of a gateway controller within an intermediate network located between the originating network and a terminating network, said first SIP-T unit transmitting said information to said address.

30. The system of claim 29, wherein said intermediate network is an internet protocol network.

* * * * *